(12) United States Patent
Ray et al.

(10) Patent No.: US 7,392,951 B2
(45) Date of Patent: Jul. 1, 2008

(54) METHODS, APPARATUSES AND ARTICLES FOR AUTOMATIC DATA COLLECTION DEVICES, FOR EXAMPLE BARCODE READERS, IN CLUTTERED ENVIRONMENTS

(75) Inventors: Jim T. Ray, Everett, WA (US); Robert A. Kohtz, Cedar Rapids, IA (US); Michael Dant, Cedar Rapids, IA (US); Jeffrey M. Hunt, Woodinville, WA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 11/436,123

(22) Filed: May 16, 2006

(65) Prior Publication Data

US 2006/0261167 A1 Nov. 23, 2006

Related U.S. Application Data

(60) Provisional application No. 60/681,779, filed on May 17, 2005.

(51) Int. Cl.
*G06K 7/10* (2006.01)

(52) U.S. Cl. .................. 235/462.2; 235/462.25; 235/462.01; 235/462.09; 235/462.45

(58) Field of Classification Search .............. 235/462.2, 235/462.25, 462.01, 462.09, 462.45, 375, 235/462.07, 462.08
See application file for complete search history.

(56) References Cited

U.S. PATENT DOCUMENTS

| | | | |
|---|---|---|---|
| 4,988,852 A | 1/1991 | Krishnan | 235/462 |
| 5,378,883 A | 1/1995 | Batterman et al. | 235/472 |
| 5,550,364 A | 8/1996 | Rudeen | 235/462 |
| 5,627,360 A | 5/1997 | Rudeen | 235/462 |
| 5,640,001 A | 6/1997 | Danielson et al. | 235/472 |
| 5,690,418 A | 11/1997 | Hsiung | 362/259 |
| 5,734,153 A | 3/1998 | Swartz et al. | 235/472 |
| 5,756,981 A | 5/1998 | Roustaei et al. | 235/462 |
| 5,770,841 A * | 6/1998 | Moed et al. | 235/375 |
| 5,880,451 A * | 3/1999 | Smith et al. | 235/462.1 |
| 6,003,775 A | 12/1999 | Ackley | 235/472.01 |

(Continued)

OTHER PUBLICATIONS

Intermec Technologies Corp., "1470/1471 Imager—User's Manual," P/N 067054-003, pp. 1-9, 3-21 to 3-36, 2001.

(Continued)

*Primary Examiner*—Michael G. Lee
*Assistant Examiner*—Allyson N Trail
(74) *Attorney, Agent, or Firm*—Seed IP Law Group PLLC

(57) ABSTRACT

A reader such as a barcode reader identifies at least one potential target such as a barcode symbol in its field-of-view, and projects or transmits an indicator toward or proximate the potential target containing information about the respective potential target. Such information may include which target is currently active, the symbology in which the target is encoded, the relative position of the reader with respect to the target, the ability of the reader to decode the target, and/or ranked or sorted order information regarding the target and neighboring targets. The reader may rank, sort, prioritize or otherwise determine order based on various parameters, including symbology, position in field-of-view, size, etc., and may base such on past history of the reader and/or user, and may weight such.

36 Claims, 10 Drawing Sheets

U.S. PATENT DOCUMENTS

| | | | |
|---|---|---|---|
| 6,060,722 A * | 5/2000 | Havens et al. | 250/566 |
| 6,095,422 A * | 8/2000 | Ogami | 235/462.27 |
| 6,138,915 A | 10/2000 | Danielson et al. | 235/472.02 |
| 6,223,988 B1 | 5/2001 | Batterman et al. | 235/472.01 |
| 6,330,974 B1 | 12/2001 | Ackley | 235/472.01 |
| 6,340,114 B1 | 1/2002 | Correa et al. | 235/462.22 |
| 6,398,112 B1 | 6/2002 | Li et al. | 235/462.01 |
| 6,417,840 B1 | 7/2002 | Daniels | 345/158 |
| 6,491,223 B1 | 12/2002 | Longacre, Jr. et al. | 235/462.01 |
| 6,641,042 B1 * | 11/2003 | Pierenkemper et al. | 235/462.01 |
| 6,641,046 B2 | 11/2003 | Durbin | 235/472.01 |
| 6,659,350 B2 | 12/2003 | Schwartz et al. | 235/462.42 |
| 6,729,546 B2 | 5/2004 | Roustaei | 235/462.45 |
| 7,090,137 B1 * | 8/2006 | Bennett | 235/472.01 |
| 2004/0099741 A1 * | 5/2004 | Dorai et al. | 235/462.08 |
| 2005/0274806 A1 | 12/2005 | Dant | 235/462.21 |
| 2006/0097053 A1 | 5/2006 | Jolivet et al. | 235/462.36 |

OTHER PUBLICATIONS

U.S. Appl. No. 11/280,955, filed Nov. 16, 2005, Thuries.
U.S. Appl. No. 11/465,222, filed Aug. 17, 2006, Lopez et al.
U.S. Appl. No. 60/756,319, filed Jan. 4, 2006, Dant.
U.S. Appl. No. 11/141,251, filed May 31, 2005, Dant.
U.S. Appl. No. 11/149,452, filed Jun. 8, 2005, Jolivet et al.
U.S. Appl. No. 11/619,888, filed Jan. 4, 2007, Dant.

* cited by examiner

METHODS, APPARATUSES AND ARTICLES FOR AUTOMATIC DATA COLLECTION DEVICES, FOR EXAMPLE BARCODE READERS, IN CLUTTERED ENVIRONMENTS

CROSS-REFERENCE TO RELATED APPLICATION

This application claims the benefit under 35 U.S.C. § 119(e) of U.S. Provisional Patent Application No. 60/681,779, filed May 17, 2005.

BACKGROUND OF THE INVENTION

1. Field of the Invention

The methods, apparatuses and articles described herein generally relate to automatic data collection (ADC) devices such as readers capable of reading automatic data collection media, for example optically reading machine-readable symbols (e.g., barcode symbols, area or matrix symbols, or stacked symbols). In particular, the methods, apparatuses and articles described herein facilitate machine-readable symbol acquisition in a cluttered environment, for example where two or more objects such as machine-readable symbols are in the field-of-view of the machine-readable symbol reader.

2. Description of the Related Art

The ADC field is generally directed to the use of devices for automatically capturing data typically encoded in media such as machine-readable symbols or radio frequency identification (RFID) tags carried by one or more items to which the encoded data typically relates.

A variety of ADC media and ADC devices for reading such ADC media are ubiquitous and well-known. For example, machine-readable symbol readers for optically reading machine-readable symbols such as barcode symbols, area or matrix symbols, or stacked symbols, are common in a large variety of retail, warehouse and shipping environments. Such machine-readable symbol readers are commonly referred to as "barcode" readers, even though they may be capable of reading machine-readable symbols other than barcodes.

The readers may be fixed, such as those typically found at many grocery or supermarket checkout stands where the item bearing the machine-readable symbol is passed over the reader. Handheld optical readers are also common. For example, wand type readers where the operator moves the optical reader across the machine-readable symbol. For other handheld readers, the operator generally aims the optical reader at the desired machine-readable symbol. The operator may optionally activate a trigger or other switch to cause the reader to read the machine-readable symbol.

Machine-readable symbol readers may take the form of optical scanners, for example, which scan a light such as a laser beam across the machine-readable symbol. Alternatively, optical readers may take the form of an imager which captures an image of the machine-readable symbol using a one- or two-dimensional image capture device to capture light reflected from the machine-readable symbol. Such light is typically provided by a flood illumination system of the machine-readable symbol reader.

The successful adoption and use of ADC devices such as machine-readable symbol readers face a number of problems. For example, such devices may be difficult to operate by a novice, particularly where the device is handheld and requires the operator to correctly space the machine-readable reader with respect to the item bearing the machine-readable symbol to be read. While many attempts have been made to improve the depth-of-field of machine-readable symbol readers, some degree of proper spacing is still typically necessary. Another problem occurs when the machine-readable symbol reader is used in a crowded environment, for example where two or more objects may be within the field-of-view of the machine-readable symbol reader. In such a situation, the operator typically will not be certain which one of the objects the machine-readable symbol reader will decode. Such an environment may, for example, occur in the guise of a standardized form, which may include text, numbers, pictures, graphics, and one or more machine-readable symbols.

Improved methods and apparatuses to address these problems would be beneficial to the ADC industry, as well as potential users of ADC devices.

BRIEF SUMMARY OF THE INVENTION

In one aspect, a method of operating a reader comprises capturing an image of an area encompassed by a field-of-view of the reader, the field-of-view encompassing a number of objects; automatically locating a representation of at least one of the number of the objects in the image; automatically determining at least in part from the at least one located representation that at least one of the number of objects is an object of interest; and projecting at least one indicator from the reader toward a region-of-interest in the area encompassed by the field-of-view of the reader which is associated with the object of interest.

In another aspect, methods and apparatuses locate potential targets, for example barcode symbols, in a field-of-view of a reader and project one or more indicators providing information regarding one or more potential targets generally toward or proximate respective ones of the potential targets. The indicator may, for example, indicate a rank, sort, prioritization or otherwise determined order of the potential targets for further processing. For example, the indicator may emphasize or highlight a currently active object, and/or employ various levels of emphasis or highlighting to indicate a ranked or sorted order. The indicator may, additionally or alternatively, identify a symbology in which the potential target is encoded, or identify that the symbology is not recognized or decodable by the reader. The indicator may, additionally or alternatively, identify that the reader is either too close or too far from the potential target. The indicator may, additionally or alternatively, identify whether the potential target is either too big or too small. The indicator may, additionally or alternatively, identify whether a spectral reflectance is too high.

In another aspect, methods and apparatuses identify multiple potential targets such as barcode symbols; rank, sort, prioritize or otherwise determine an order for the potential targets; and project the order information generally toward potential targets. The methods and systems emphasize or highlight a number of the potential targets in a ranked, sorted or prioritized order. The number may be user configurable. The order may be based on one or more criteria, for example: particular symbology, type of symbology (e.g., one-dimensional versus two-dimensional), enabled symbologies (i.e., symbologies which the reader is currently programmed to decode), symbologies of the most recently decoded symbols, position of the potential target in the field-of-view, size of the potential target, or may be based on other criteria. Some of the criteria may be user configurable, and some criteria may be discerned by the methods and systems based on prior use of the reader and/or based on prior use by the user. The criteria may be weighted.

In another aspect the methods and apparatuses may allow the user to "tab" or successively step through potential targets in a ranked, sorted, prioritized or otherwise determined order. The indicators may be updated to visually cue the user as to the currently highest ordered potential target and/or subsequently ranked potential targets. The methods and systems may allow the user to select one or more potential targets to be further processed, for example via decoding, by operating a switch or by failing to operate a switch in a set period of time.

In yet another aspect, the methods and apparatuses update a position of an indicator to track the respective potential target. Such may accommodate for movement of a handheld reader as the user's hand moves.

In a still another aspect, the methods and apparatuses may adjust the optical characteristics of an illumination source. Such adjustment may be performed based on prior image acquisition, or may be made prior to a final image acquisition to enhance the illumination of a portion of an area containing the potential target in the field-of-view of the reader.

In yet still another aspect, the methods and apparatuses may adjust the optical characteristics of a sensor such as an optical subsystem that focuses an image on an imager to enhance the resulting image and facilitate processing of the image, for example, the decoding of machine-readable symbols such as barcode symbols.

In a further aspect, the method and apparatuses may include a dual function switch that allows the user to select between acquiring an image and tabbing or sequentially selecting between potential targets in a ranked, sorted, prioritized or otherwise determined order. For example, a "single click" may select a next highest ranked potential target, while a "double click" causes the acquisition of a new image.

In yet a further aspect, the methods and apparatuses may process the most highly ranked potential target if no user input is received within a set period of time. The set period of time may be user configurable.

In still a further aspect, the methods and apparatuses may capture multiple objects on single scan, allowing the sequential decoding of selected objects without requiring further image acquisition. The number of objects sequentially decoded may be user configurable.

In yet still a further aspect, the methods and apparatuses may disqualify a region of a field-of-view of the reader from further processing. The region may be user selectable and/or may be determined by the reader based on historical use of the reader and/or the historical operation by a specific user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with methods and apparatuses for automatic data collection devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the disclosed methods and structures. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

Indicate Single Potential Target in Multiple Target Environment

Figure 1A:
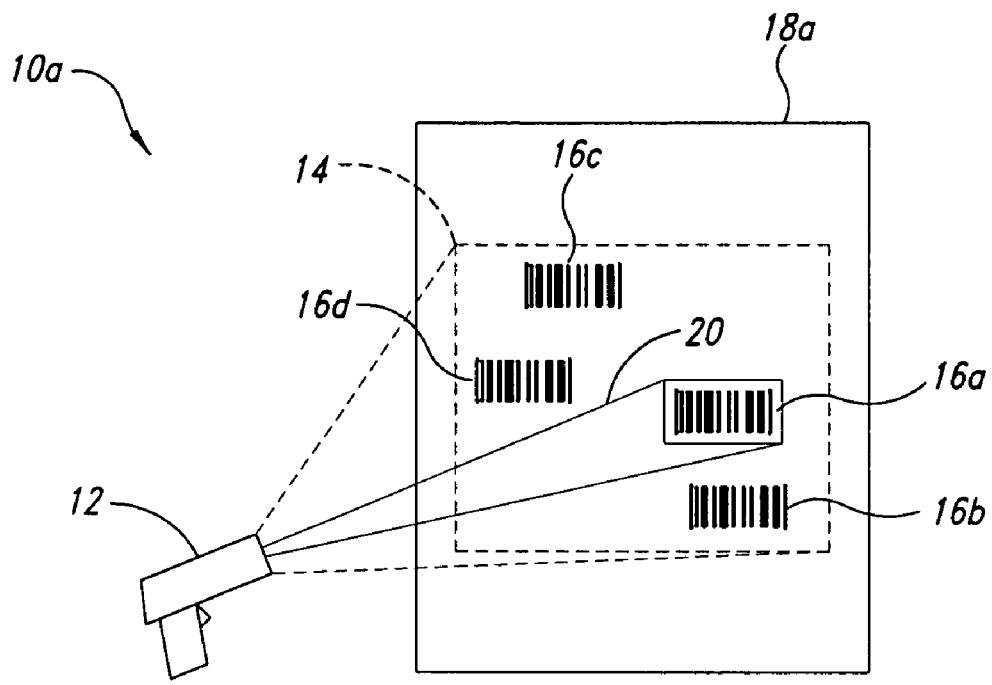
FIG. 1A is a schematic diagram of an environment in which an ADC device with a field-of-view encompassing multiple objects operates according to one illustrated embodiment.

FIG. 1A shows an environment 10a in which an ADC device such as a machine-readable, symbol reader 12 may operate according to an illustrated embodiment. The machine-readable symbol reader 12 may have a field-of-view represented by broken lines 14 which may encompass one or more objects for example one or more machine-readable symbols 16a-16d.

The machine-readable symbols 16a-16d can take any of a variety of forms including barcodes, area or matrix codes and/or stacked codes. The machine-readable symbols 16a-16d may be encoded in one or more of a variety of symbologies, for example, UPC/EAN, Code 39, Code 43, Code 93, and/or UPS code. The machine-readable symbols 16a-16d may be carried on one or more pieces of media, for example packaging 18a.

The machine-readable symbol reader 12 may project or otherwise transmit an indicator identified by solid lines 20 to visually provide information about one or more of the objects, as discussed in detail below. The indicators may take a variety of forms, for example, geometric shapes, icons, and/or text including alphabetic and/or numeric characters.

As illustrated in FIG. 1A, the machine-readable symbol reader 12 may project or otherwise transmit an indicator toward or proximate one of the objects. For example the machine-readable symbol reader 12 may project or otherwise transmit indicator 20 to provide information about the machine-readable symbol 16a. The indicator 20 may be spatially related to the respective machine-readable symbol 16a. For example, the machine-readable symbol reader 12 may project or transmit the indicator 20 toward or proximate the respective machine-readable symbol 16a. For example, the machine-readable symbol reader 12 may project or transmit the indicator 20 to at least partially encompass the respective machine-readable symbol 16a.

In at least some embodiments, the indicator 20 may provide information about the respective machine-readable symbol 16a and/or about a respective rank, sort or order of the machine-readable symbol 16a with respect to other machine-readable symbols 16b-16d, and/or other objects in the field-of-view 14 of the machine-readable symbol reader 12. For example, the indicator 20 may outline or otherwise identify or indicate that one of the machine-readable symbols 16a, out of the entire set of machine-readable symbols 16a-16d in the field-of-view of the machine-readable symbol reader 12, is identified as the machine-readable symbol that the machine-readable symbol reader 12 is ready or set to decode.

Indicate Multiple Potential Targets in Multiple Target Environment

Figure 1B:
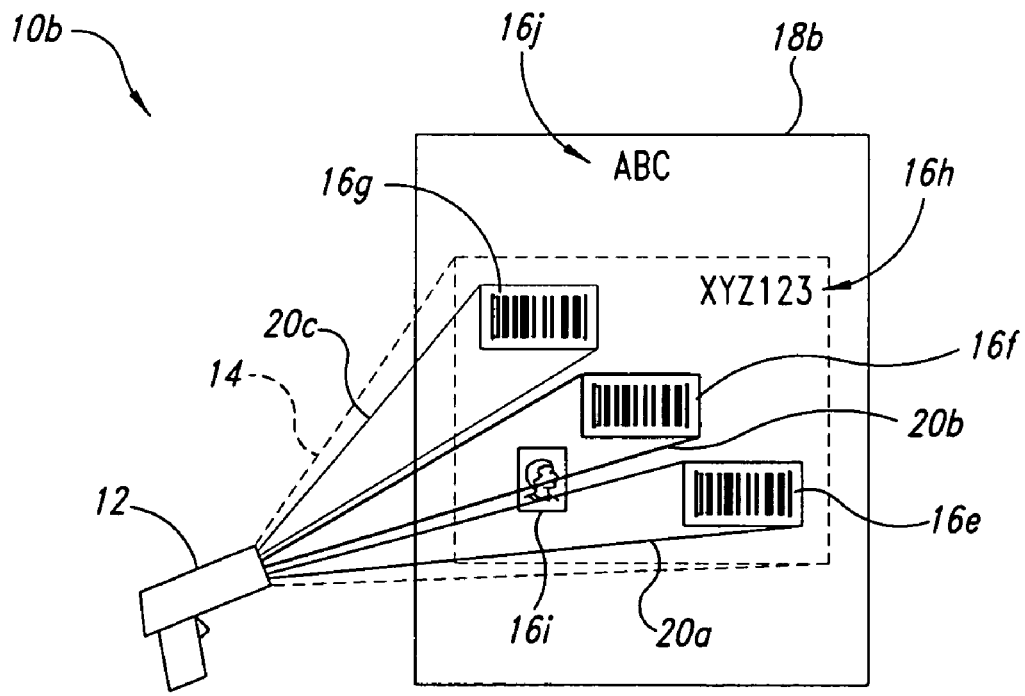
FIG. 1B is a schematic diagram of an environment in which an ADC device having a field-of-view encompassing multiple objects operates according to another illustrated embodiment.

FIG. 1B shows an environment 10b where the field-of-view 14 of the machine-readable symbol reader 12 encompasses a number of objects. For example, the objects include three machine-readable symbols 16e-16g, as well as alphanumeric text 16h and/or pictures or graphics 16i. The machine-readable symbols 16e-16g, text 16h and graphics or pictures 16i may be carried on any of a variety of media, for example, a standardized form 18b. Other objects on the form 18b may reside outside the field-of-view 14 of the machine-readable symbol reader 12, for example text 16j.

The machine-readable symbol reader 12 may project or otherwise transmit an indicator identified by solid lines 20a-20c to visually provide information about one or more of the objects, as discussed in detail below. The indicators 20a-20c may again take a variety of forms for providing a visual indication of information including, for example, geometric shapes, icons and text.

As illustrated in FIG. 1B, the machine-readable symbol reader 12 may project or otherwise transmit multiple indicators to respective ones of some or all of the objects. For example the machine-readable symbol reader 12 may project or otherwise transmit indicators 20a-20c toward the objects having characteristics corresponding to machine-readable symbols (e.g., machine-readable symbols 16e-16g). The indicators 20a-20c may be spatially related to the respective machine-readable symbol 16e-16g. For example, the machine-readable symbol reader 12 may project or transmit the indicator 20a toward or proximate the respective machine-readable symbol 16e. For example, the machine-readable symbol reader 12 may project or transmit the indicator 20a to at least partially encompass the respective machine-readable symbol 16e.

In at least some embodiments, the indicators 20a-20c may provide information about the respective machine-readable symbols 16e-16g and/or about a respective rank, sort or order of the machine-readable symbols 16e-16g with respect to other machine-readable symbols 16e-16g, and/or other objects 16h-16i in the field-of-view 14 of the machine-readable symbol reader 12.

As described in more detail below, the indicators 20a-20c may provide information about the respective machine-readable symbols 16e-16g and/or about a respective rank, sort or order of the machine-readable symbols 16e-16g with respect to one another. For example, the indicators 20a-20c may indicate a determined ranking, sorting, or ordering of the machine-readable symbols 16e-16g for processing by the machine-readable symbol reader 12. For example, the indicator 20b spatially associated with (e.g., encompassing) the machine-readable symbol 16f may be highly emphasized to indicate that the machine-readable symbol 16f is the first symbol that will be decoded if the user makes a particular selection or if the user does not indicate otherwise. Likewise, the indicator 20a spatially associated with (e.g., encompassing) the machine-readable symbol 16e may be intermediately emphasized (i.e., less emphasis than the indicator 20b and greater emphasis than the indicator 20c) to indicate that the machine-readable symbol 16e is ranked behind the machine-readable symbol 16f but ahead of the machine-readable symbol 16g in the order of processing. Likewise, the indicator 20c spatially associated with (e.g., encompassing) the machine-readable symbol 16g may be minimally emphasized (i.e., less emphasis than indicators 20a, 20b, but more emphasis than objects without any indicator and hence without any emphasis), to indicate that the machine-readable symbol 16g is last in the defined order of processing.

The visual indication of the varying degrees of emphasis may be provided in a variety of ways. For example, an intensity, color and/or thickness or line weight of the indicators 20a-20c may be varied. Thus the highest ranked machine-readable symbol 16f may be associated with the brightest and/or thickest indicator 20b, while progressively dimmer and/or thinner line weights are associated with sequentially lower ranked, sorted or ordered machine-readable symbols 16e, 16g.

Alternatively or additionally, rank or order information may be visually indicated to the user in a time domain. For example, the indicator 20b associated with the highest ranked machine-readable symbol 16f may be flashed or marqueed at the fastest rate, while indicators 20a, 20c associated with lower ranked machine-readable symbols 16e, 16g may be flashed or marqueed at correspondingly lower rates. Alternatively, or additionally, rank or order information may be visually indicated to the user in a time domain by sequentially projecting or transmit the indicators 20a-20c in a pattern that corresponds to the rank of the respective machine-readable symbols 16e-16g. For example, the reader 12 may project the indicator 20b spatially associated with the machine-readable symbol 16f first, then project the indicator 20a associated with the machine-readable symbol 16e second, followed by the indicator 20c associated with the machine-readable symbol 16g third. Thus, the reader 12 can indicate to the user that the machine-readable symbol 16f is ranked first, machine-readable symbol 16e ranked second, and machine-readable symbol 16g ranked third.

EXAMPLES OF SPECIFIC INDICATORS

Figure 2A:
FIG. 2A is a front view of a machine-readable symbol and an indicator according to one illustrated embodiment.

FIG. 2A shows an indicator 20d encompassing a machine-readable symbol 16. The indicator 20d may take the form of a broken line geometric pattern, such as a box, with the elements of the pattern being sequentially turned ON and OFF to achieve a marqueeing effect similar to that used in computer displays and on theater marquees. As discussed above, the rate at which the elements of the pattern are flashed may correspond to a rank or order of the associated machine-readable symbol 16. Thus, the highest ranked machine-readable symbol may marquee or sequentially flash at the highest rate, while indicators associated with successively lower ranked machine-readable symbols will be marqueed at a progressively lower rates.

Figure 2B:
FIG. 2B is a front view of a machine-readable symbol and an indicator according to another illustrated embodiment.

FIG. 2B shows an indicator 20e associated with a machine-readable symbol 16. The indicator 20e may include text such as alphabetic and/or numeric characters that provide information about the associated machine-readable symbol 16. For example, the text may identify the particular symbology in which the symbol 16 is encoded. The text may as illustrated overlie the machine-readable symbol 16, or may, for example, be disposed above and/or below the machine-readable symbol 16. The indicator 20e may also include other visual effects to visually queue the user, for example, illuminating the symbol 16 differently from other symbols in the field-of-view of the reader 12.

Figure 2C:
FIG. 2C is a front view of a machine-readable symbol and an indicator according to yet another embodiment.

FIG. 2C shows an indicator 20f spatially associated with a machine-readable symbol 16. The indicator 20f may include text such as alphabetic and/or numeric characters that provide information related to the relative position of the reader 12 with respect to the machine-readable symbol 16. For example, the indicator 20f may provide a visual indication to the user that the reader 12 is too close to the machine-readable symbol 16. The indicator 20f may also include other visual indicators, for example, an icon or box that may provide a visual indication of the rank or order of the symbol relative to other symbols.

Figure 2D:
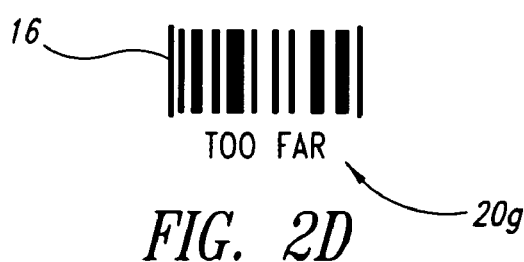
FIG. 2D is a front view of a machine-readable symbol and an indicator according to still another embodiment.

FIG. 2D shows an indicator 20g spatially associated with a machine-readable symbol 16. The indicator 20g may include text such as alphabetic and/or numeric characters that provide information related to the relative position of the reader 12 with respect to the machine-readable symbol 16. For example, the indicator 20f may provide a visual indication to the user that the reader 12 is spaced too far from the machine-readable symbol 16.

Figure 2E:
FIG. 2E is a front view of a machine-readable symbol and an indicator according to a further embodiment.

FIG. 2E shows an indicator 20h associated with a machine-readable symbol 16. The indicator 20h may provide information regarding an ability of the machine-readable symbol reader 12 to decode the particular symbology in which the machine-readable symbol 16 is encoded. For example, the indicator 20h may indicate that while a machine-readable symbol 16 has been found, the reader 12 is not currently capable of decoding the particular symbology in which the machine-readable symbol 16 is encoded, or does not otherwise recognized the particular symbology.

Figure 2F:
FIG. 2F is a front view of a machine-readable symbol and an indicator according to yet a further embodiment.

FIG. 2F shows an indicator 20i associated with a machine-readable symbol 16. The indicator 20i may provide further information about the ability to acquire the machine-readable symbol 16 to the user. For example, the indicator 20i may indicate that the symbol 16 is too big to successfully decode given the current configuration and/or positioning of the machine-readable symbol reader 12 with respect to the machine-readable symbol 16.

Figure 2G:
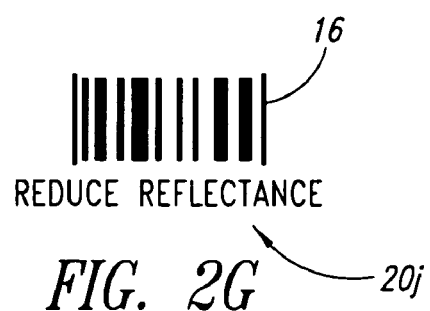
FIG. 2G is a front view of a machine-readable symbol and an indicator according to still a further embodiment.

FIG. 2G shows an indicator 20j associated with a machine-readable symbol 16. The indicator 20j may provide information regarding the ability of the machine-readable symbol reader 12 to capture and/or decode the machine-readable symbol 16. For example, the indicator 20j may indicate that spectral reflectance is too high to successfully read the machine-readable symbol 16.

FIGS. 2A-2G illustrate a small number of the possible types of indicators and the type of information that such indicators can visually provide. Thus, the embodiments of FIGS. 2A-2G should be considered illustrative and not limiting.

Exemplary Reader Structure

Figure 3:
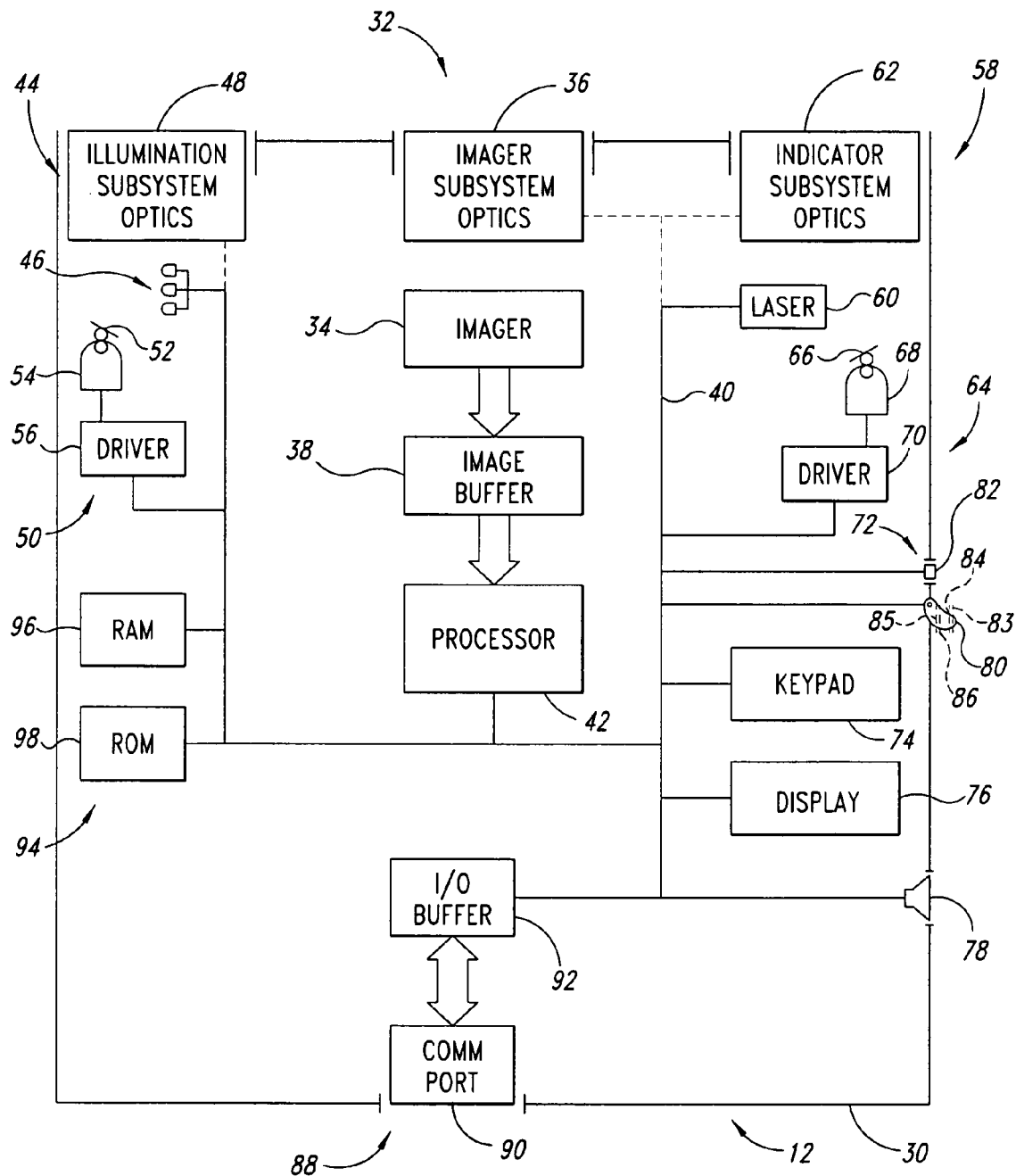
FIG. 3 is a functional block diagram of a machine-readable symbol reader according to one illustrated embodiment.

FIG. 3 shows various elements of the machine-readable symbol reader 12 according to one illustrated embodiment. One or more of the illustrated elements may be received in a housing 30 of the reader 12. Alternatively, one or more of the illustrated elements may be external to the housing 30. Further, the machine-readable symbol reader 12 may omit some of the illustrated elements and/or may include other elements not illustrated in FIG. 3.

Imaging Subsystem

The machine-readable symbol reader 12 may include an imaging subsystem 32, comprising an imager 34, imager subsystem optics 36, and an image buffer 38.

The imager 34 can take a variety of forms, for example, a one- or two-dimensional image capture device, for example a one- or two-dimensional array of charge coupled devices (CCDs).

The imager subsystem optics 36 are generally spaced between the imager 34 and a window of the housing 30 for optically rendering an image of the target or objects on the imager 34. The imager subsystem optics 36 can take a variety of forms including simple and/or compound lenses and/or reflectors, refractors or filters. The imager subsystem optics 36 may be fixed and incapable of adjustment, or may be manually and/or automatically adjustable. For example, the imager subsystem optics 36 may include a motor, solenoid and/or actuator for adjusting spacing between various optical elements to adjust a focus, aperture, and/or depth-of-field based on various input. Alternatively, or additionally, the imager subsystem optics 36 may include a microfluidic lens assembly such as that described in commonly assigned U.S. provisional patent application Ser. No. 60/538,868 filed Jan. 23, 2004; and U.S. patent application Ser. No. 11/040485, filed Jan. 20, 2005, which claims benefit from U.S. provisional application Ser. No. 60/538,868. Signals for operating the imager subsystem optics 36 may be provided via a system bus 40.

The imager 34 provides image data to an optional image buffer 38, which may temporarily store the image data for processing, for example via a processor 42. Thus, the processor 42, or portions thereof and/or functions performed thereby, may in some aspects be considered part of the imaging subsystem 32.

Illumination Subsystem

The machine-readable symbol reader 12 may include an illumination subsystem 44 operable to illuminate the field-of-view 14 (FIGS. 1A, 1B) of the machine-readable symbol reader 12. The illumination subsystem 44 may include an illumination source 46, illumination subsystem optics 48, and a positioning system 50.

The illumination source 46 may take the form of one or more light sources, for example, a number of light emitting diodes (LEDs). The illumination source 46 is operable to selectively produce illumination. The illumination source 46 may provide illumination in a selected band of the electromagnetic spectrum, and/or may employ filters to provide illumination in a selected band. Alternatively, the illumination source 46 may provide illumination generally distributed across the visual range of the electromagnetic spectrum.

The illumination subsystem optics 36 are generally spaced proximate a window of the housing 30 for illuminating the target or objects. The illumination subsystem optics 48 can take a variety of forms including simple and/or compound lenses and/or reflectors, refractors or filters. The illumination subsystem optics 36 may be fixed and incapable of adjustment, or may be manually or automatically adjustable. For example, the illumination subsystem optics 48 may include a motor, solenoid, and/or actuator for adjusting the spacing between various optical elements to adjust a focus, aperture or depth-of-field based on various input. Alternatively, or additionally, the illumination subsystem optics 48 may include a microfluidic lens assembly such as that described in commonly assigned U.S. provisional patent application Ser. No. 60/538,868 filed Jan. 23, 2004; and U.S. patent application Ser. No. 11/040485, filed Jan. 20, 2005 which claims benefit from U.S. provisional application Ser. No. 60/538, 868. Signals for operating the illumination subsystem optics 48 may be provided via the system bus 40.

The positioning subsystem 50 may include one or more reflectors 52, an actuator 54 coupled to move the reflectors 52, and an optional driver 56 for driving the actuator 54. The reflector 52 may take the form of a mirror or prism, or an array of micro-machined mirrors. The driver 56 is coupled to the processor 42 via the system bus 40. Thus, the processor 42, portions thereof, and/or functions performed thereby, may in some aspects be considered a portion of the illumination subsystem 44.

Indicator Subsystem

The machine-readable symbol reader 12 also includes an indicator subsystem 58 operable to produce the indicator 20. The indicator subsystem 58 comprises an illumination source such as a laser 60, indicator subsystem optics 62, and a positioning subsystem 64.

The laser 60 is selectively operable to produce a laser beam for forming the indicators, for example, geometric shapes, icons, and/or text including alphabetic and/or numeric characters.

The indicator subsystem optics 62 are generally spaced proximate a window of the housing 30 for projecting or otherwise transmitting indicators toward the target or objects. The indicator subsystem optics 62 may take a variety of forms including simple and/or compound lenses and/or reflectors, refractors or filters. The indicator subsystem optics 62 may be fixed and incapable of adjustment, although in most practical embodiments will be automatically operable to adjust the focus of the indicator 20 projected or otherwise transmitted from the machine-readable symbol reader 12.

The positioning subsystem 64 may comprise one or more reflectors 66 positioned to reflect light from the laser 60 through the indicator subsystem optics 62. The positioning subsystem 64 also includes a motor, solenoid and/or actuator 68 operable to selectively move the reflector 66. The positioning subsystem 64 may comprise an optional driver 70, operable to drive the motor, solenoid and/or actuator 68. The positioning subsystem 64 is operable to produce the desired indicator 20 in the form of geometric shapes, icons, and/or text such as alphabetic and/or numeric characters. The positioning subsystem 64 is also operable to position the indicator 20 in appropriate portions of the field-of-view 14 of the machine-readable reader 12 so as to spatially associate the indicator 20 with the respective one of the machine-readable symbols 16a-16g or other objects 16h-16i (FIGS. 1A and 1B).

User I/O Subsystem

The machine-readable symbol reader 12 may further comprise a user input/output (I/O) subsystem 72. The user I/O subsystem 72 may include a user operable keypad 74, a display 76, a speaker 78, and one or more user operable switches such as first switch 80 and second switch 82.

The keypad 74 may take the form of any conventional keypad, allowing the user to manually enter instructions and/or data by keying. The display screen 76 may take the form of any conventional display, for example, a liquid crystal (LCD) display capable of visually displaying information to the user. The display 76 may optionally take the form of a touch screen display, allowing the user to enter commands and data by selecting icons displayed on the display 76. The speaker 78 may be conventional and operable to provide audible information to the user. Such audible information may, for example, take the form of alerts such as beeps and/or buzzes, as well as synthesized voice.

User Actuable Switches

The first switch 80 may be conveniently located on the housing 30 to allow the user to selectively activate the machine-readable symbol reader 12, for example, to capture an image. Similarly the second switch 82 may be conveniently located on the housing 30 to allow the user to selectively activate the machine-readable symbol reader 12, for example, to tab or move through objects in a ranked or sorted order. In one embodiment, the first switch 80 takes the form of a trigger positioned on the housing 30 to be selectively operated using the index finger of the user while grasping the machine-readable symbol reader 12, while the second switch 82 is takes the form of a button positioned on the housing to be selectively operated using the thumb of the user while grasping the machine-readable symbol reader 12. The positioning of the first and second switches for activation by the index finger and thumb may provide ergonomic advantages, for example apportioning the repetitive activity between two digits of the user's hand rather than one, and may be easier for a novice user to learn since different switches obtain different functions.

In an alternative embodiment, the second switch 82 may take the form of a second trigger, positioned on the housing 30 proximate the first switch 80 to be selectively operated using the index finger of the user while grasping the machine-readable symbol reader 12. The positioning of the second switch 82 as a second trigger may provide ergonomic advantages, since the typical user has a high degree of dexterity with the index finger and would not have to differentiate between digits in what may constitute a highly repetitive activity.

In a further alternative embodiment, the first switch 80 takes the form of a dual function switch, eliminating the second switch 82. For example, the first switch 80 may take the form of a dual function trigger positioned on the housing 30 to be selectively operated using the index finger of user while grasping the machine-readable symbol reader 12. The duel functionality of the first switch 80 may, for example, be implemented using multiple positions of the first switch 80. For example, no user selection or input is detected when the first switch 80 is in a first, default or non-activated position 83. Moving the first switch 80 to a second position 84, causes the machine-readable symbol reader 12 to acquire an image of all objects in the field-of-view 14 of the machine-readable symbol reader 12. Moving the first switch 80 to a third position 86 causes the machine-readable symbol reader 12 to sequentially select a next one of the objects (e.g., machine-readable symbol) in the field-of-view 14 of the machine-readable symbol reader 12 in a ranked or sorted order for processing. For example, each successive movement of the first switch 80 to the third position 86 causes the machine-readable symbol reader 12 to increment through the machine-readable symbols 16e-16g (FIG. 1B) in ranked order, the machine-readable symbol reader 12 successively highly emphasizing the current or most highly ranked object (e.g., machine-readable symbol). Optionally, moving the first switch 80 to a fourth position 85 causes the machine-readable symbol reader to process (e.g., decode) the currently highest ranked one of the objects. The use of a multiple position first switch and elimination of the second switch 82 may provide ergonomic advantages, since the typical user has a high degree of dexterity with the index finger and would not have to differentiate between digits in what may constitute a highly repetitive activity.

Additionally, or alternatively, the dual functionality of the first switch 80 may, for example, be implemented based on an amount of time between successive activations of the first switch 80. For example, two successive activations of the first switch 80 (i.e., activations within a short period of time such as "double clicking" when using a computer pointer device such as a mouse) may cause the machine-readable symbol reader 12 to acquire an image of the objects in the field-of view 14, while a single activation of the trigger 80 may cause the machine-readable symbol reader 12 to increment to a next object in the ranked, sorted, prioritized or otherwise determined order. Failure to activate the first switch 80 within a defined period may cause the machine-readable symbol reader to automatically process (e.g., decode) the currently highest ranked or sorted object (e.g., machine-readable symbol). The use of timing may provide ergonomic advantages, since the total number of switch activations would be reduced. Further, use of timing such as "double clicking" is familiar to most potential users.

It should be recognized that the particular mapping between switches, switch activation positions, and/or successive rapid switch activations with respect to specific operations or functions described above is not necessary to the embodiments, and different or even a reverse mapping of switches and/or activations with respect to the operations or functions may be achieved, although certain of the above embodiments provide unique advantages as discussed generally above and/or as will be apparent to those of skill in the art on reviewing the teachings herein. While the machine-readable symbol reader 12 may be preconfigured with switch positions and times, these will typically be user configurable parameters which may be altered via the user I/O subsystem 72. Thus, for example, the user may select how quickly successive activations of the first switch 80 must occur to cause the user inputs to be treated as selection of a tabbing function rather than selection of an image acquisition function. Further, the user may select how quickly the first switch must be activated following the display of an indicator to cause the machine-readable symbol reader to select a next highest ranked target rather than automatically processing the currently highest ranked target. Other parameters, as well as the specific indicators, may also be user configurable. For example, the total number of indicators provided (e.g., 3 in FIG. 1B) may be a user selectable parameter. Thus, the user can set the machine-readable symbol reader 12 to project or transmit indicators for only, for example, the five highest ranked objects.

Communications Subsystem

The machine-readable symbol reader 12 may further comprise a communications subsystem 88 for communicating with other devices. The communications subsystem 88 may include an interface such as a communications port 90 and an optional I/O buffer 92 coupling the communications port 90 to the system bus 40. The communications subsystem may be of conventional design.

Control Subsystem

The machine-readable symbol reader 12 further includes a control subsystem 94 which may comprise the system bus 40, processor 42 and memory such as random access memory (RAM) 96 and/or read-only memory (ROM) 98. While the processor 42 is illustrated using a single box, the processor 42 may take the form of one or more processors, such as microprocessors, digital signal processors (DSPs), and/or application specific integrated circuits (ASICs). For example, the machine-readable symbol reader 12 may comprise a processor for controlling operation of the various subsystems 32, 44, 58, and a dedicated DSP for handling the image processing and/or decoding. The control subsystem 94 may contain additional or other memory devices, including flash memory and/or EEPROMs, hard disks, optical disks such as CD-ROMs, etc.

High Level Operation

Figure 4A:
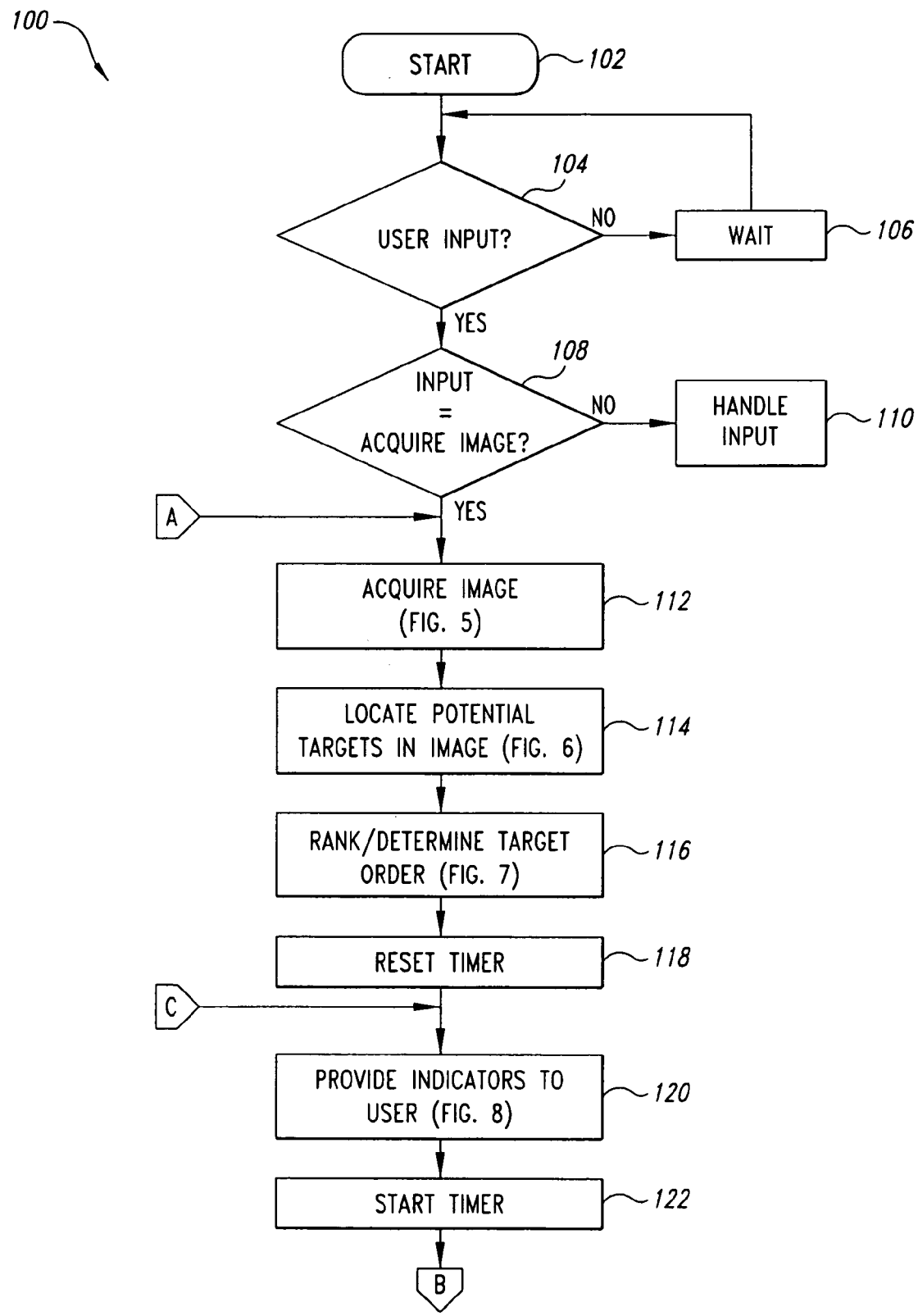
FIGS. 4A and 4B are a high level flow diagram showing a method of operating the machine-readable symbol reader of FIG. 3 according to one illustrated embodiment.
Figure 4B:
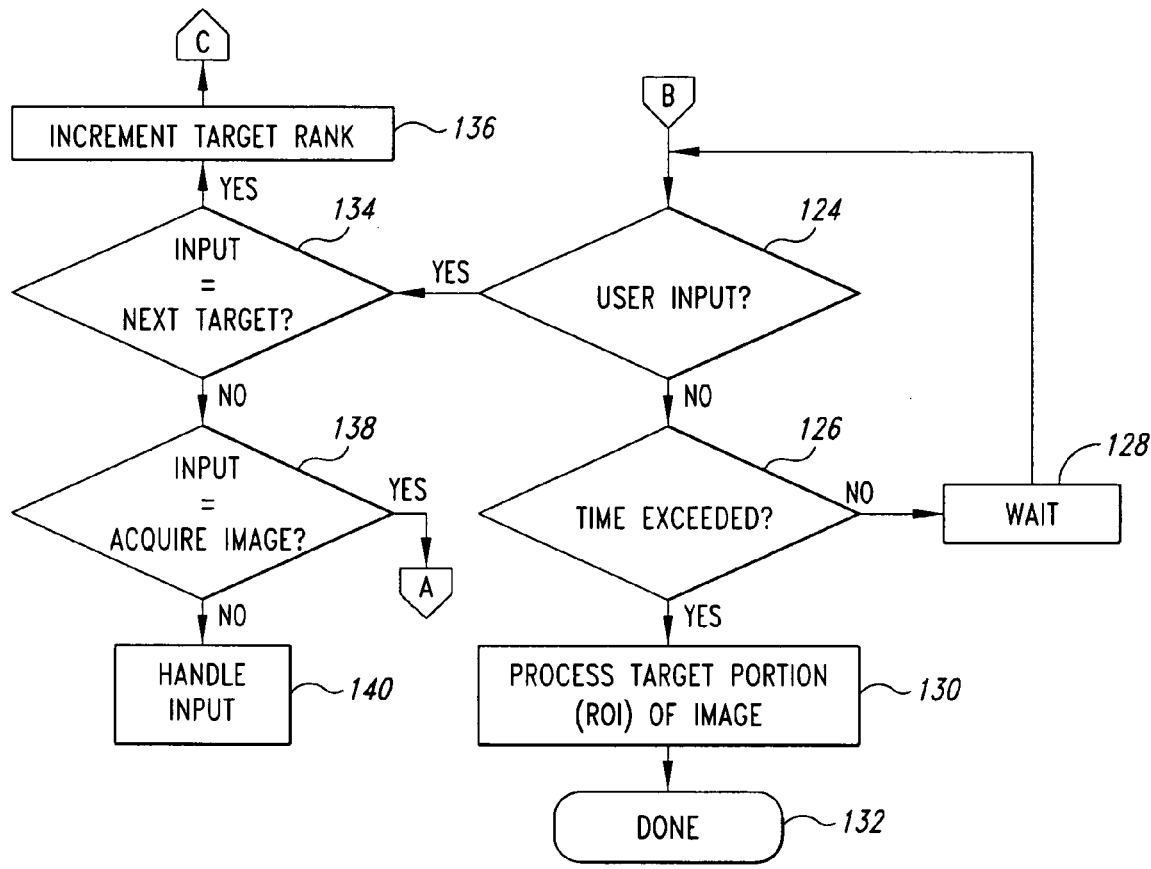

FIGS. 4A and 4B show a high level method 100 of operating the machine-readable symbol reader 12 according to one illustrated embodiment, starting at 102.

At 104, the machine-readable symbol reader 12 determines whether a user input has been received. If no user input has been received, the machine-readable symbol reader waits at 106, from time-to-time returning to 104. Once the user input has been received, at 108 the machine-readable symbol reader 12 determines whether the input directs the machine-readable symbol reader 12 to acquire an image. If the input does not direct the machine-readable symbol reader 12 to acquire an image, the input is handled by an input handling routine at 110, which optionally may return control to 102 after completion.

At 112, the machine-readable symbol reader 12 acquires an image of the objects in the field-of-view 14 of the machine-readable symbol reader 12. At 114, the machine-readable symbol reader 12 locates potential targets (e.g., representations of machine-readable symbols 16a-16g) in the image. Areas of the image containing potential targets may be referred to as regions of interest (ROI). As described in detail below, the machine-readable symbol reader 12 may locate potential targets using a high level machine vision processing routine to identify representations in the image of objects which have characteristics that correspond to machine-readable symbols.

At 116, the machine-readable symbol reader 12 ranks, sorts or otherwise determines an order for the located targets. As described in detail below, the machine-readable symbol reader 12 may rank, sort or order targets based on a comparison of certain characteristics of the potential target against one or more criteria. At 118, the machine-readable symbol reader 12 resets a timer. The timer may be implemented in the processor 42 or may be a discrete circuit or unit.

At 120, the machine-readable symbol reader 12 provides indicators 20, 20a-20j (FIGS. 1A, 1B, 2A-2G) to the user. As described above and in further detail below, the indicators 20, 20a-20j may take any of a variety of forms and may provide information regarding the object (e.g., symbology), information about the relative position of the object with respect to the machine-readable symbol reader 12 (e.g., too far, too close) and/or a rank or order of priority of the object with respect to other objects. At 122, the machine-readable symbol reader 12 starts the timer.

At 124, the machine-readable symbol reader 12 determines whether an input has been received from the user. If no input has been received, the machine-readable symbol reader 12 determines at 126 whether a time has been exceeded. While the time may be preconfigured, in most embodiments the time will be user configurable. If the time has not been exceeded the machine-readable symbol reader 12 performs a wait loop at 128, from time-to-time returning control to 124 until a user input is received or the until the time is exceeded.

If the machine-readable symbol reader 12 determines at 126 that the time has been exceeded, in one embodiment that indicates that the user desires the currently highest ranked target to be processed. At 130, the machine-readable symbol reader 12 processes the target portion or ROI of the image, and terminates the method 100 at 132. Processing the target portion may, for example, comprise decoding the representation of the machine-readable symbol 16 contained in the target portion or ROI.

If a user input was received at 124, the machine-readable symbol reader 12 determines whether the user input indicates that a next target should be selected at 134. If the user input indicates that a next target should be selected, the machine-readable symbol reader 12 increments the target rank at 136 such that the next highest ranked target becomes active, and returns control to 120 to project or otherwise transmit one or more corresponding indicators to the user. In this way the user can increment through a number of targets in a ranked, sorted or prioritized order with the simple activation of the second switch 82 and/or first switch 80.

If the machine-readable symbol reader 12 determines at 134 that the input does not indicate that the user desires a next target, control passes to 138. At 138 the machine-readable symbol reader 12 determines whether the input directs the machine-readable symbol reader 12 to acquire a new image. If the input directs the machine-readable symbol reader 12 to acquire a new image, control passes to 112 to cause acquisition of a new image. Otherwise the input is handled by an input handling routine at 140, which optionally may return control to 102 after completion.

Low Level Operation—Acquire Image

Figure 5:
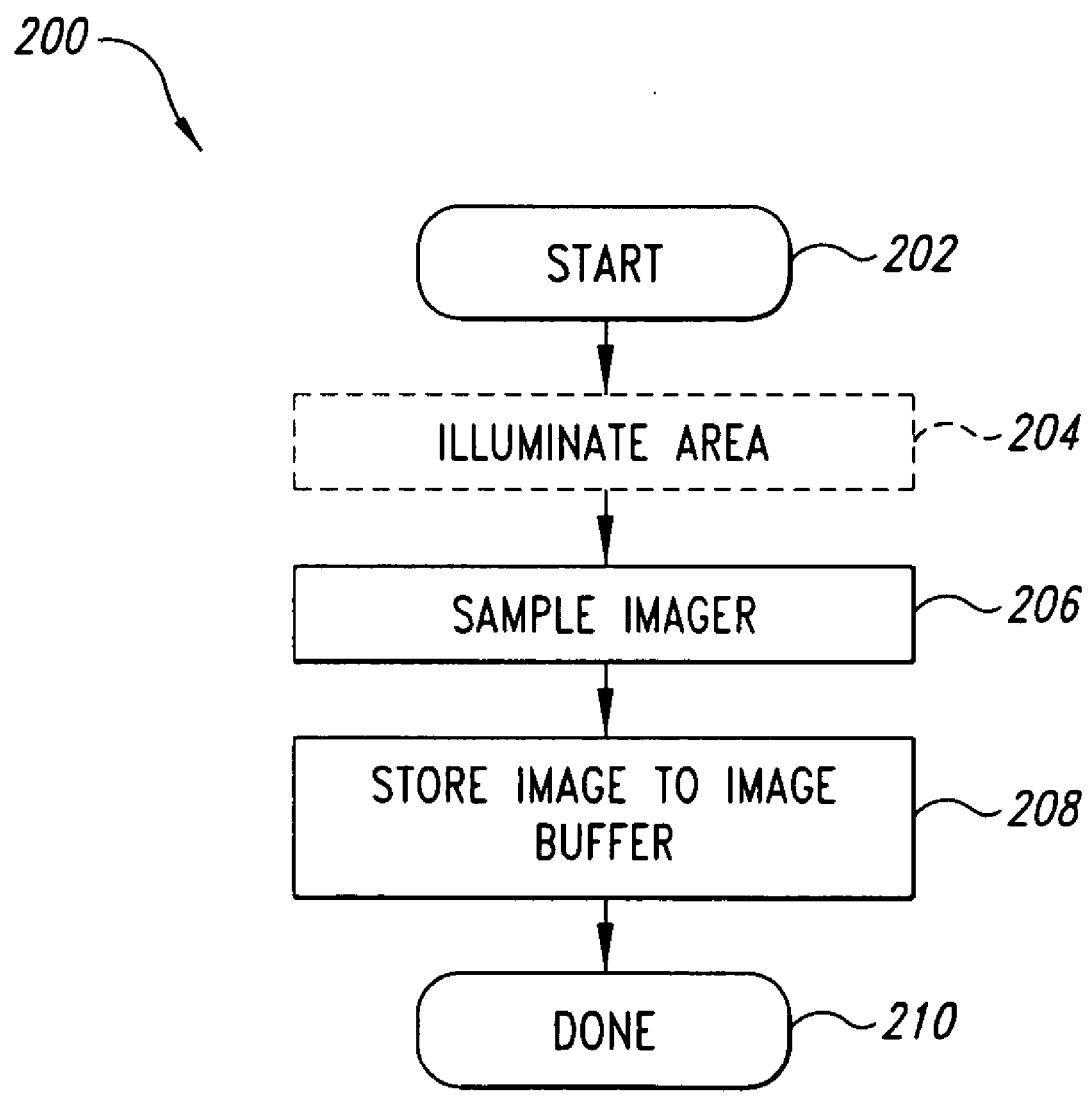
FIG. 5 is a low level flow diagram showing a method of operating the machine-readable symbol reader of FIG. 3 to acquire an image according to one illustrated embodiment.

FIG. 5 shows a method 200 of acquiring an image according to one illustrated embodiment, starting at 202. At 204, the illumination subsystem 44 illuminates an area encompassed by the field-of-view 14 (FIGS. 1A, 1B) of the machine-readable symbol reader 12. The illumination subsystem 44 may focus or position the illumination to selectively illuminate only a portion of the entire area encompassed by the field-of-view 14 of the machine-readable symbol reader 12 or may illuminate the entire field-of-view 14.

At 206, the imager 34 acquires the image, for example, by electrically sampling each pixel or CCD array element of the imager 34. The image subsystem optics 36 may optionally adjust the focus, aperture or depth-of-field, for example using active and/or passive range finding techniques, such as those taught in commonly assigned U.S. provisional patent application Ser. No. 60/538,868 filed Jan. 23, 2004; and U.S. patent application Ser. No. 11/040485, filed Jan. 20, 2005. At 208, the image is optionally stored in the image buffer 38. The method 200 terminates at 210.

Low Level Operation—Locate Potential Targets in Image

Figure 6:
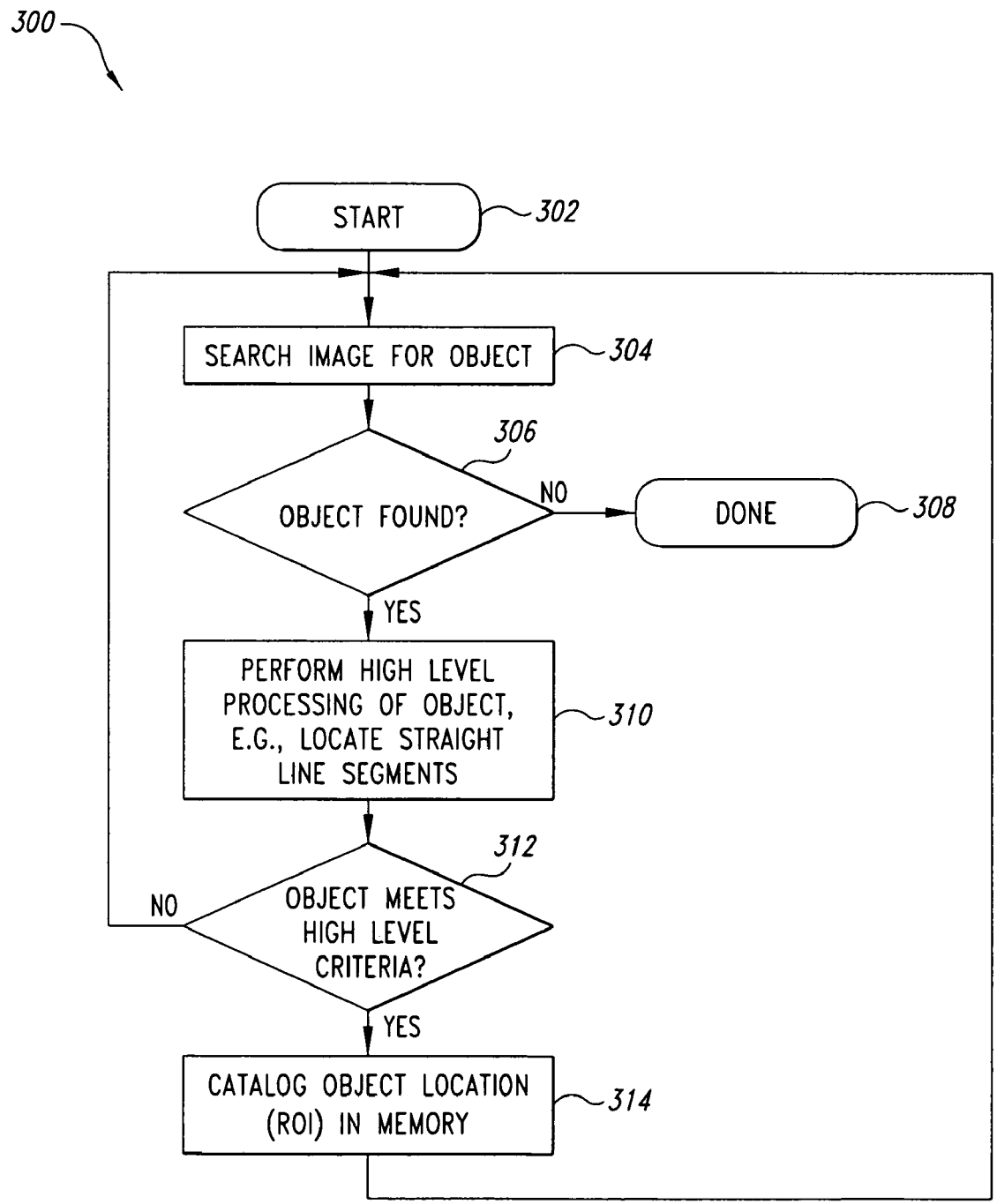
FIG. 6 is a low level flow diagram of a method of operating the machine-readable symbol reader of FIG. 3 to locate potential targets in the acquired image according to one illustrated embodiment.

FIG. 6 shows a method 300 of locating potential targets in the image starting at 302. At 304, the processor 42 searches the image for representations of various objects. At 306 the processor 42 determines whether an object has been found. If no object is found, the method 300 terminates at 308.

If an object is found, the processor 42 performs high level machine vision processing on the representation of the object to determine whether the object corresponds to some set of high level criteria. For example, the high level processing may locate straight line segments in an attempt to determine whether the representation of the object corresponds to that of a barcode symbol or whether the representation corresponds to an undesired object such as text 16h (FIG. 1B), photograph or graphic 16i, or side of a package 18a (FIG. 1A) or form 18b (FIG. 1B).

At 312, the processor 42 determines whether the representation of the object meets the high level criteria. If the high level criteria is not met, control returns to 304 to search for additional objects. If the high level criteria is met, the processor 42 catalogs the location of the representation of the object or ROI in memory at 314, and returns control to 304 to search for additional objects.

Figure 7:
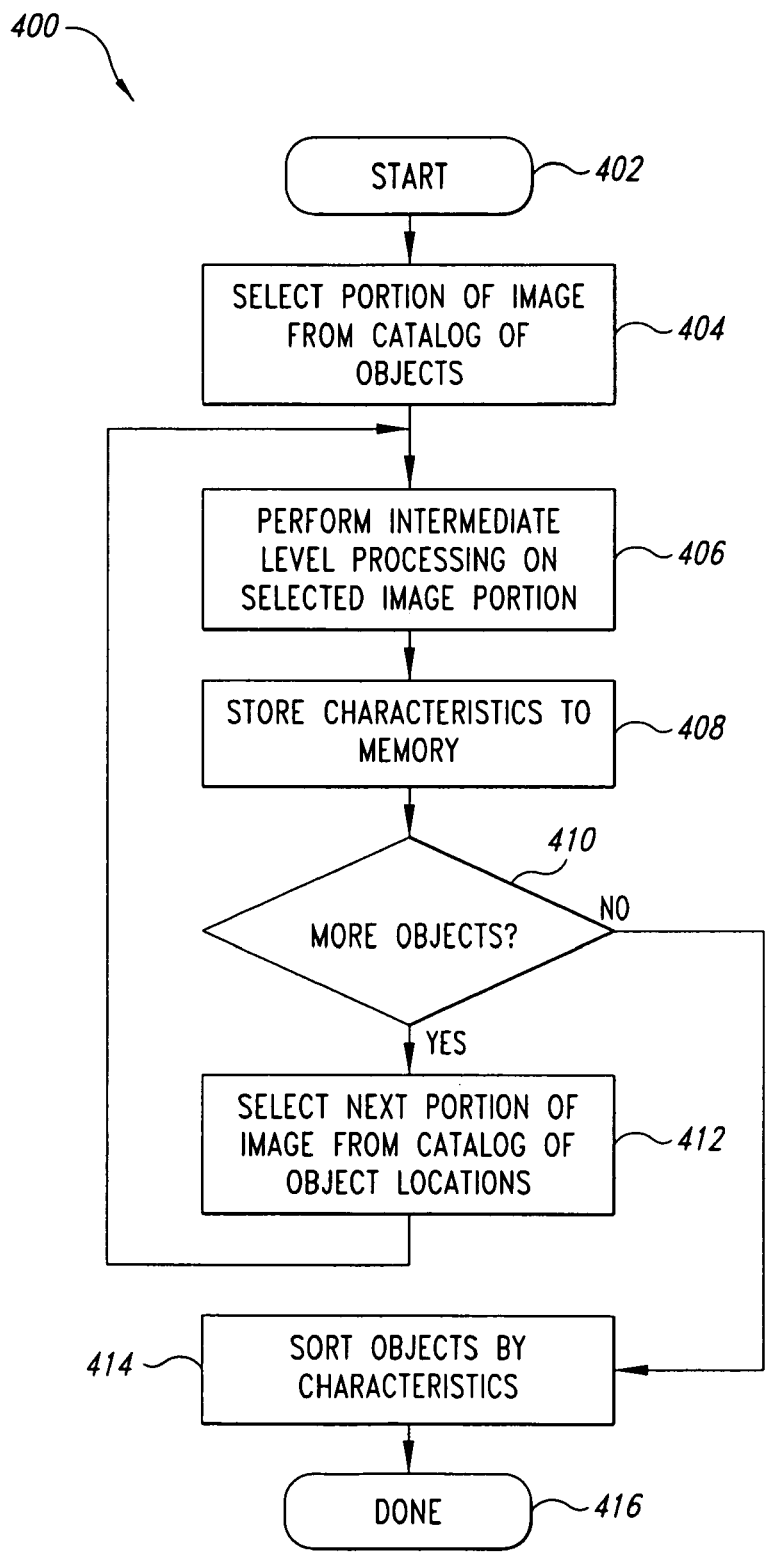
FIG. 7 is a low level flow diagram showing a method of operating the machine-readable symbol reader of FIG. 3 to rank or determine an order of the potential targets with respect to some criteria according to one illustrated embodiment.

Low Level Operation—Ranking, Sorting, Prioritizing or Ordering Potential Targets FIG. 7 is a low level flow diagram of a method 400 of ranking, sorting, ordering, prioritizing or otherwise determining a target order according to one illustrated embodiment, starting at 402.

At 404, the processor 42 selects a portion of the image from the catalog of objects. At 406, the processor 42 performs an intermediate level of machine vision processing on the selected image portion. The processor 42 may determine certain characteristics of the representation of the object in the image. For example, the processor 42 may determine the location of the region of interest in the field-of-view 14. Additionally or alternatively, the processor 42 may determine whether the object is a one-dimensional machine-readable symbol or a two-dimensional machine-readable symbol. Additionally or alternatively, the processor 42 can determine whether the machine-readable symbol is encoded in a particular symbology and/or whether the machine-readable symbol reader 12 is capable of decoding the particular symbology. At 408 the processor 42 stores the determined characteristics from 406 to memory 96.

At 410, the processor 42 determines whether there are more objects to process. If there are more objects to process, at 412, the processor 42 selects the next portion of the image from the catalog of object locations and returns control to 406.

If there are no more objects to process, control passes to 414, where the processor 42 sorts objects by the determined characteristics. In particular the processor 42 may compare determined characteristics to certain criteria to rank, sort, order or otherwise prioritize regions of interest with respect to one another. Thus, for example, the processor 42 may rank, sort, order or prioritize regions of interest based on a pre-defined criteria or preference, a user defined preference, or criteria or preference determined from a historical pattern of usage of the machine-readable symbol reader 12 and/or user.

Such criteria or preferences may reflect a preference for particular symbologies, for example ranking representations corresponding to machine-readable symbols of one symbology over those of one or more other symbologies. For example, the representations may be ranked according to the symbologies of the machine-readable symbols that were most recently selected for further processing (e.g., decoding). The number of machine-readable symbols most recently selected for processing that will be used in prioritizing may be user configurable. The criteria or preference may be set for ranking representations corresponding to enabled symbologies (e.g., machine-readable symbol reader 12 currently programmed to decode symbols encoded in the particular symbology) highest.

Additionally, or alternatively, the criteria or preference may be set for ranking larger machine-readable symbols higher, since such are likely to be in the foreground. Alternatively, the criteria or preference may rank small machine-readable symbols higher, for example where all machine-readable symbols appear on a single plane such as a standardized form, and the user recognizes that the desired information is consistently encoded in the smallest of the machine-readable symbols.

Additionally, or alternatively, the ranking, sorting, ordering or prioritization may be based on a preference for representations appearing in a certain portion of the field-of-view as opposed to other portions. Thus, for example, regions of interest appearing in the center of the field-of-view 14 may be given preference over regions appearing in other portions of the field of view 14. Additionally and alternatively, certain regions of the field-of-view 14 may be defined as having low or no priority. Thus, for example, the user may define a region that should be ignored or the machine-readable symbol reader 12 may determine that a particular region such as the lower left corner of the field-of-view 14 should consistently be ignored based on the history of prior symbol acquisition and/or decoding.

The machine-readable symbol reader 12 can be programmed to identify and apply criteria based on previous operation or history. The previous use or history may be that of the machine-readable symbol reader 12 without regard to the user, that of the user without regard to the particular machine-readable symbol reader 12, or a combination. Where based on the historical use of a user, a user specific file will be maintained and transported or accessible between machine-readable symbol readers 12. The user specific file may be identified by a user identifier, and access may be controlled via a password or personal identification number. The processor 42 may, for example, determine a preference for machine-readable symbols of a particular symbology based on a preset or user configurable number of previous decode selections. Thus, for example, if in the previous five most recent operations, the user has consistently selected one symbology over another symbology, the processor can recognize that and employ that as a criteria in ranking. Thus, the machine-readable symbol reader 12 may employ algorithms similar to that taught in U.S. Pat. No. 6,095,422, issued Aug. 1, 2000.

Method 400 terminates at 416 where there are no objects or no more objects to process.

Figure 8:
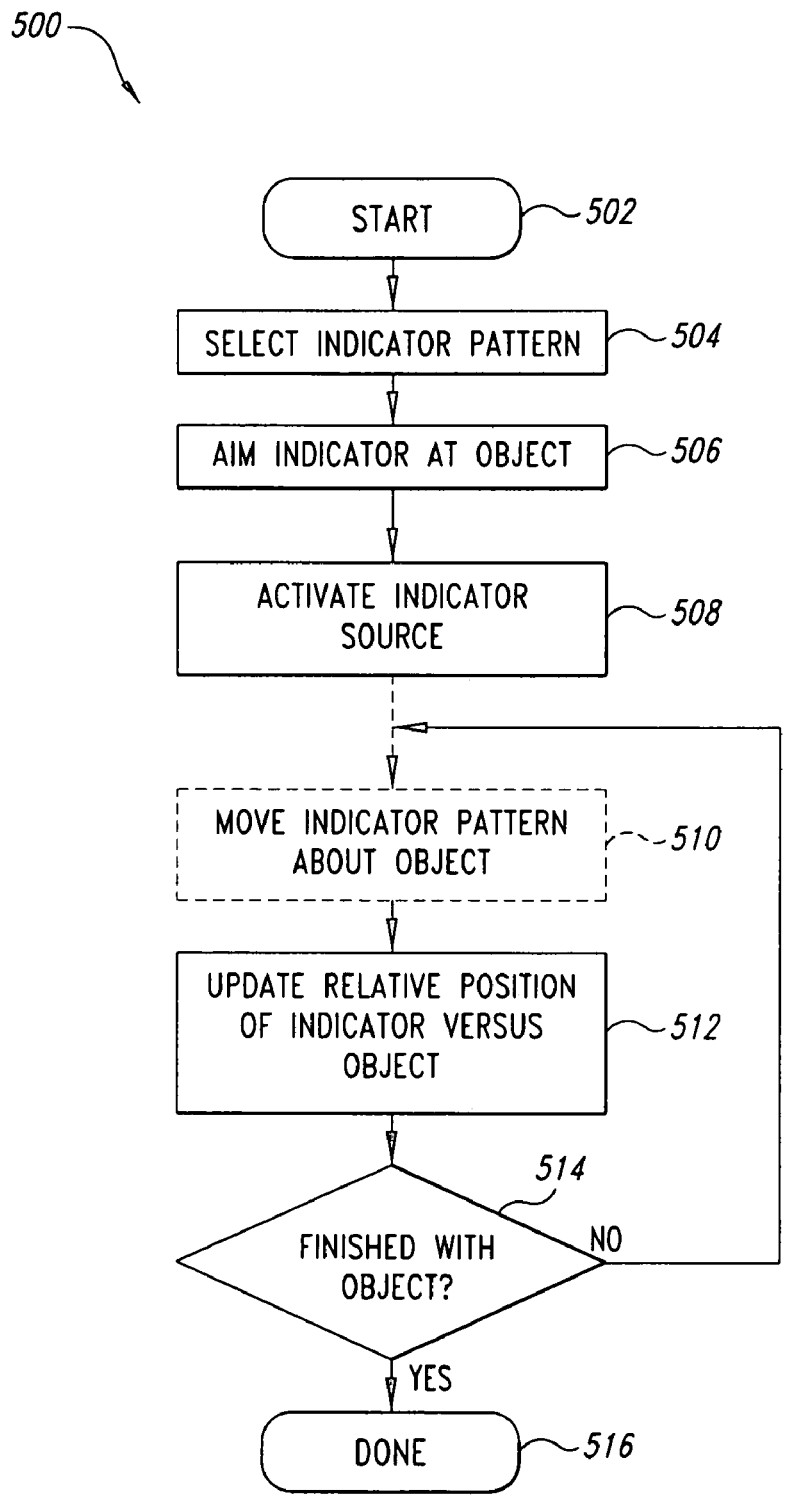
FIG. 8 is a low level flow diagram showing a method of operating the machine-readable symbol reader of FIG. 3 to indicate information about the potential targets to a user of the machine-readable symbol reader according to one illustrated embodiment.

In at least one embodiment, an identification of the target or ROI may cause the machine-readable symbol reader 12 to reacquire an image or a portion of an image, either automatically or in response to a user input. The image or portion thereof may be reacquired using the illumination subsystem 44 to focus or position the illumination so as to selectively illuminate only a portion of the entire area encompassed by the field-of-view 14 of the machine-readable symbol reader 12 that corresponds to the ROI in the image. Such may reduce power consumption and/or increase contrast leading to a higher rate of successful decodes. Similarly, the imager subsystem optics 36 may focus on only a portion of the entire area encompassed by the field-of-view 14 of the machine-readable symbol reader 12 that corresponds to the ROI in the image Low Level Operation—Providing Indicators FIG. 8 shows a low level method 500 of providing indicators to a user according to one illustrated embodiment starting at 502.

At 504, the processor 42 selects an indicator. As noted above, indicators may be user configurable, although the processor 42 may select from defined indicator patterns based on matches or correspondence between the characteristics of the representations with certain criteria. Thus, in one embodiment for example, the user may configure or define the general format of the indicator pattern, while the specific information projected or not projected in the indicator will depend on the characteristics of the specific machine-readable symbol that the representation in the image represents.

At 506, the indicator subsystem 58 adjusts the position or aiming at the portion of the area in the field-of-view 14 corresponding to the region of interest in the image. At 508, the laser 60 is activated to produce the desired indicator. Optionally at 510, the positioning subsystem 64 moves the indicator about the selected area. At 512, the processor 42 updates the relative position of the indicator versus the selected area. At 514, the processor 42 determines whether the user is finished with the object. If the user is finished with the object the method 500 terminates at 516, otherwise control returns to 510.

Low Level Operation—Tracking Objects

Figure 9:
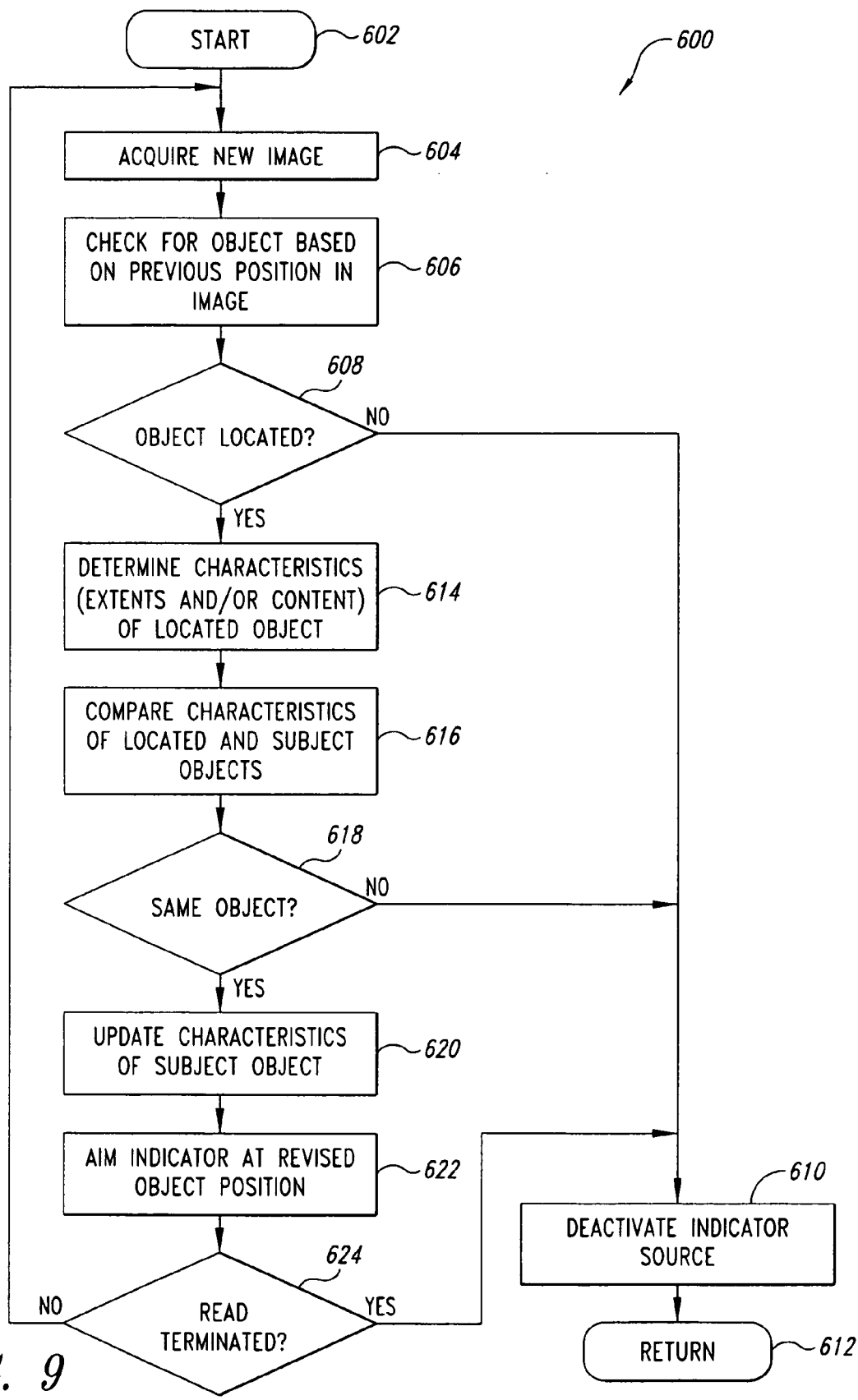
FIG. 9 is a low level flow diagram showing a method of operating the machine-readable symbol reader of FIG. 3 to maintain the indicator in spatial relation to the respective potential target according to one illustrated embodiment.

FIG. 9 shows a method 600 of maintaining the spatial position of the indicator relative to the respective object according to one illustrated embodiment starting at 602. Method 600 may be useful in adjusting to or accommodating for movement of the reader particularly where the reader is handheld.

At 604, the machine-readable symbol reader 12 acquires a new image. At 606, the processor 42 checks for the object based on a previous position of the representation of the object (e.g., machine-readable symbol) in the image. At 608, the processor 42 determines whether the object has been located. If the object has not been located, the processor 42 deactivates the indicator source or laser 60 at 610 and terminates or returns to a calling routine at 612.

If the object is located at 608, the processor 42 determines the characteristics of the located object at 614. The characteristics may include the extent and/or content of the object.

At 616, the processor 42 compares the determined characteristics of the located and subject objects. At 618, the processor 42 determines whether the located object is the same as the subject object. If the located object is not the same as the subject object, control passes to 610. If it is determined that the located object and the subject object are the same, the processor 42 updates the characteristics of the subject object in memory at 620.

At 622 the indicator subsystem 58 adjusts or aims at a revised portion of the field-of-view 14 based on a determination of the difference in position of the representation of the object between the first image and the new image. At 624 the processor 42 determines whether the read has been terminated, passing control to 610 if the read has been terminated and returning control to 604 if the read has not been terminated.

SUMMARY

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein of the invention can be applied to other ADC systems and methods, as well as other machine-vision systems and methods, not necessarily the exemplary machine-readable symbol systems and methods generally described above. For example, the methods and systems taught herein may be applied to objects other than machine-readable symbols. While generally discussed in terms of projecting or transmitting indicators toward or proximate the target objects, in some embodiments information may be displayed on the display 76 of the user I/O interface 72. Such an approach may be advantageous as being simple and inexpensive to implement, but would not provide the type of sensory feedback provided by projecting the indicator toward or proximate the object. Thus, such a modification would not provide the same type of rapid training to novice users or direct positive feedback as is provided by projecting the indicator toward or proximate the object.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to in commonly assigned U.S. Provisional Application Ser. No. 60/538,868, filed Jan. 23, 2004; U.S. Provisional Application Ser. No. 60/681,779, filed May 17, 2005; U.S. application Ser. No. 11/040,485, filed Jan. 20, 2005; and U.S. Pat. No. 6,095,422, issued Aug. 1, 2000, are incorporated herein by reference in their entireties. Aspects of the invention can be modified, if necessary, to employ systems, circuits and concepts of the various patents, applications and publications to provide yet further embodiments of the invention.

These and other changes can be made to the embodiments in light of the above-detailed description. In general, in the following claims, the terms used should not be construed to limit the invention to the specific embodiments disclosed in the specification and the claims, but should be construed to include all vision based or ADC systems and methods that operate in accordance with the claims. Accordingly, the invention is not limited by the disclosure, but instead its scope is to be determined entirely by the following claims.

The invention claimed is:

1. A method of operating a machine-readable symbol reader, the method comprising:
   capturing an image of an area encompassed by a field-of-view of the machine-readable symbol reader, the field-of-view encompassing a number of objects;
   automatically locating a respective object-representation of at least two objects of the number of objects in the image;
   automatically determining at least in part from the respective object-representation of the at least two objects that at least one of the number of objects is a respective object of interest;
   automatically producing at least one indicia in the form of light reflected from a reflector of the machine-readable symbol reader; and
   after determining at least in part from the respective object-representation of the at least two objects that at least one of the number of objects is a repective object of interest, selectively projecting in accordance with a respective rank of a respective object of interest at least one indicia in the form of light reflected from the reflector toward a respective region-of-interest in a respective sub-area of the area encompassed by the field-of-view of the machine-readable symbol reader which is associated with the respective object of interest of the at least one object of interest such that light reflected from the reflector illuminates at least a portion of the respective region-of-interest.

2. The method of claim 1 wherein automatically determining at least in part from the respective object-representation of the at least two number of objects that at least one of the number of objects is a respective object of interest comprises:
   determining a respective at least one characteristic from the respective object-representation for each of the at least two objects of the number of objects; and
   comparing the repectives at least one determined characteristic to at least one defined criteria for each of the at least two objects of the number of objects.

3. The method of claim 2, further comprising:
   ranking the at least two objects of the number of objects based at least in part on the comparing of the respective at least one determined characteristic to at least one defined criteria for each of the at least two objects of the number of objects.

4. The method of claim 3 wherein the number of objects includes at least two objects of interest, and wherein selectively projecting in accordance with a respective rank of the respective object of interest at least one indicia in the form of light reflected from the reflector toward a respective region-of-interest in a respective sub-area of the area encompassed by the field-of-view of the machine-readable symbol reader which is associated with the respective object of interest of the at least one object of interest such that light reflected from the reflector illuminates at least a portion of the respective region-of-interest comprises for at least two of the at least two objects of interest, selectively projecting respective indicia indicative of information related to the respective object of interest in the form of light reflected from the reflector toward the respective region-of-interest associated with the respective object of interest.

5. The method of claim 3, further comprising:
determining whether a user object selection input is received within a defined period of time after selectively projecting in accordance with a respective rank of a respective object of interest at least one indicia in the form of light reflected from the reflector toward the respective region-of-interest in a respective sub-area of the area encompassed by the field-of-view of the machine-readable symbol reader which is associated with the respective object of interest.

6. The method of claim 5, further comprising:
processing the respective object-representation in the image of a highest ranked object of the at least two objects if the user object selection input is not received with the defined period of time, wherein the at least two objects are ranked from highest to lowest.

7. The method of claim 5, further comprising:
selectively projecting at least one indicia in the form of light reflected from the reflector toward a respective region-of-interest in a respective sub-area of the area encompassed by the field-of-view of the machine-readable symbol reader which is associated with a next highest ranked one of the at least two objects if the user object selection input is received, wherein the at least two objects are ranked from highest to lowest.

8. The method of claim 1 wherein selectively projecting in accordance with a respective rank of a respective object of interest at least one indicia in the form of light reflected from the reflector toward a respective region-of-interest in a respective sub-area the area encompassed by the field-of-view of the machine-readable symbol reader which is associated with the respective object of interest of the at least one object of interest such that light reflected from the reflector illuminates at least a portion of the respective region-of-interest further comprises for at least two objects of interest, selectively projecting a respective indicia in the form of light reflected from the reflector toward the respective region-of-interest associated with the respective object of interest, wherein the respective indicia for a highest ranked one of the at least two objects of interest is different from the respective indicia for a next highest ranked one of the at least two objects of interest.

9. The method of claim 1 wherein selectively projecting in accordance with a respective rank of a respective object of interest at least one indicia in the form of light reflected from the reflector toward a respective region-of-interest in a respective sub-area of the area encompassed by the field-of-view of the machine-readable symbol reader which is associated with the respective object of interest comprises selectively projecting at least one human intelligible indicia in the form of light reflected from the reflector.

10. The method of claim 9 wherein selectively projecting at least one human intelligible indicia in the form of light reflected from the reflector comprises projecting an alphanumeric message.

11. The method of claim 10 wherein the respective object of interest is a machine-readable symbol and projecting an alphanumeric message comprises projecting an alphanumeric message regarding a symbology in which the machine-readable symbol is encoded.

12. The method of claim 9 selectively projecting at least one human intelligible indicia in the form of light reflected from the reflector comprises projecting indicia representing a respective rank of the respective object-representation of the at least two objects in a default sequence in which the respective object-representations will be decoded unless a user input is received.

13. The method of claim 9 wherein the repective object of interest is a machine-readable symbol and projecting at least one human intelligible indicia comprises projecting an alphanumeric message regarding a relative position of the machine-readable symbol reader with respect to the machine-readable symbol.

14. The method of claim 1 wherein selectively projecting in accordance with a respective rank of a respective object of interest at least one indicia in the form of light reflected from the reflector toward a respective region-of-interest in a respective sub-area of the area encompassed by the field-of-view of the machine-readable symbol reader which is associated with the respective object of interest comprises selectively projecting a respective indicia in the form of light reflected from the reflector toward the respective region-of-interest in a respective sub-area of the area encompassed by the field-of-view of the machine-readable symbol reader that is spatially associated with the respective object of interest.

15. The method of claim 1 wherein selectively projecting in accordance with a respective rank of a respective object of interest at least one indicia in the form of light reflected from the reflector toward a respective region-of-interest in a respective sub-area of the area encompassed by the field-of-view of the machine-readable symbol reader which is associated with the respective object of interest of the at least one object of interest such that light reflected from the reflector illuminates at least a portion of the respective region-of-interest comprises selectively projecting a respective indicia in the form of light reflected from the reflector toward the respective region-of-interest in a respective sub-area of the area encompassed by the field-of-view of the machine-readable symbol reader that is proximate the respective object of interest.

16. The method of claim 1 wherein selectively projecting in accordance with a respective rank of a respective object of interest at least one indicia in the form of the light reflected from the reflector toward a respective region-of-interest in a respective sub-area of the area encompassed by the field-of-view of the machine-readable symbol reader which is associated with the respective object of interest of the at least one object of interest comprises projecting the at least one indicia in the form of light reflected from the reflector toward a respective portion of the area encompassed by the feild-of-view of the machine-readable symbol reader that encompasses at least a portion of the respective object of interest.

17. The method of claim 1 wherein the number of objects includes at least two machine-readable symbols, each machine-readable symbol being a respective object of interest, a first one of the least two machine-readable symbols being a highest ranked object of interest, and a second one of the least two machine-readable symbols being a next highest ranked object of interest.

18. The method of claim 1 wherein the at least two objects of the number of objects included in the image include a first machine-readable symbol and a second machine-readable symbol, wherein automatically determining at least in part from the respective object-representation of the at least two objects that at least one of the number of objects is a respective object of interest, further comprises:

determining that the first machine-readable symbol of the number of objects is a respective machine-readable symbol based at least upon the respective object-representation of the first machine-readable symbol in the image;

determining that the second machine-readable symbol of the number of objects is a respective machine-readable symbol based at least upon the respective object-representation of the second machine-readable symbol oin the image; and ranking the first machine-readable symbol higher than the second machine-readable symbol object.

19. The method of claim 1 wherein the machine-readable symbol reader is a machine-readable symbol reader grasped by a hand of a user, and wherein capturing an image of an area encompassed by a field-of-view of the machine-readable symbol reader comprises manually aiming the machine-readable symbol reader toward the area by the user grasping the machine-readable symbol reader.

20. The method of claim 19 wherein capturing an image of an area encompassed by a field-of-view of the machine-readable symbol reader comprises manually actuating an imager of the handheld machine-readable symbol reader configured to capture the image of the area.

21. A reader, comprising:

an imager having a field-of view selectively positionable to encompass an area comprising a plurality of objects and operable to image the area and the plurality of objects, at least one machine-readable symbol being included in the plurality of objects;

an image processing subsystem configured to automatically locate a repective object-representation of a respective object of the plurality of objects for at least two objects of the plurality objects in the image, wherein at least one object-representation represents the at least one machine-readable symbol of the plurality of objects in the area captured in the image;

a processor configured to automatically determine at least in part from a respective object-representation of the at least two object-representations that a respective object of the plurality of objects is a respective object of interest and configured to rank each object of interest from highest to lowest, wherein each at least one machine-readable symbol machine-readable symbol of the plurality of objects is a respective object of interest; and an indicator subsystem configured to project a respective indicia of a plurality of indicia from the reader toward a respective region-of-interest of a plurality of regions-of-interest for each object of interest in accordance with the rank of each object of interest, each region-of-interest being in the area encompassed by the field-of-view of the reader and associated with a respective object of interest and being smaller than the area encompassed by the field-of-view of the reader.

22. The reader of claim 21 wherein the processor is configured to automatically determine at least in part from a respective object-representation of the at least two object-representations that a respective object of the plurality of objects is a respective object of interest and configured to rank each object of interest from highest to lowest by:

determining a respective at least one characteristic of a respective object-representation of the at least one two object-representations for each of the at least two object representations; and for each respective object-representation having a respective at least one characteristic, comparing the respective at least one characteristic to at least one defined criteria to determine whether there is a match, and in response to the respective at least one characteristic mathching the at least one defined criteria, determining that the respective object that is reprsented in the image by the respective object-representation is a respective object of interest.

23. The reader of claim 22 wherein the processor is further configured to rank each object of interest from highest to lowest based at least in part on the comparison of the respective at least one characteristic to the at least one defined criteria for each respective object-representation having a repective at least one characteristic.

24. The reader of claim 21 wherein the indicator subsystem includes a light source and an adjustable reflector for producing a plurality of indicia in the form of light reflected from the adjustable reflector, the indicator subsystem being configured to project a first indicia of the plurality of indicia in the form of light reflected from the adjustable reflector toward a first region-of-interest of the plurality of regions-of interest in the area encompassed by the field-of view of the reader and a second indicia of the plurality of indicia in the form of light reflected from the adjustable reflector toward a second region-of-interest of the plurality of regions-of-interest in the area encompassed by the field-of-view of the reader, wherein the first and the second indicia are different.

25. The reader of claim 21 comprising:

a housing configured to be grasped by a hand of a user of the reader and configured to carry the imager, the image processing subsystem, the processor, and the indicator subsystem; and an actuator on the housing configured to actuate the imager to capture the image of the area.

26. A method of operating a machine-readable symbol reader, the method comprising:

capturing an image of an area encompassed by a field-of-view of the machine-readable symbol reader, the field-of-view encompassing a plurality of objects that includes a plurality of machine-readable symbols;

automatically locating a respective representation of each respective object of the plurality of the objects in the image;

automatically determining at least in part from the respective located representations that multiple objects of the plurality of objects are each object of interest, each object of interest being associated with a respective region-of-interest in a sub-area of the area encompassed by the field-of-view of the machine-readable symbol reader, wherein the multiple object of interest includes at least two of the machine-readable symbols of the plurality of machine-readable symbols; and projecting a respective indicia indicative of information related to the respective object of interest from the machine-readable symbol reader toward the respective region-of-interest associated with a respective object of interest for at least one of the multiple objects of interest.

27. The method of claim 26 wherein each region-of-interest is smaller than the area encompassed by the field-of view of the machine-readable symbol reader.

28. The method of claim 26 wherein at least two of the respective indicia are different.

29. A method of operating a handheld machine-readable symbol reader, comprising:

capturing a number of objects in an area encompassed by a field-of-view of the handheld machine-readable symbol reader in an image, the number of objects including at least one machine-readable symbol object and at least one non-machine-readable symbol object;

locating a number of potential target-images within the image of the number of objects in the area encompassed by the field-of-view of the handheld machine-readable symbol reader, each respective potential target-image of the number of potential target-images being a respective image of a respective one of the first number of objects, the number of potential target-images including a respective image of the at least one machine-readable symbol;

determining a number of target-images based at least upon the number of potential target-images, the number of target-images including a respective image of the at least one machine-readable symbol;

ranking each respective target-image of the number of target-images from a highest rank to a lowest rank;

associating a respective region-of-interest in a respective sub-area of the area encompassed by the field-of-view of the handheld machine-readable symbol reader for each ranked target-image of the number of target-images;

producing a number of light-indicia in the form of light reflected from a reflector of the handheld machine-readable symbol reader; and projecting a respective light-indicia of the number of light-indicia toward the respective region-of interest in the respective sub-area of the area encompassed by the field-of view of the handheld machine-readable symbol reader for at least one target-image of the number of target images in accordance with the ranking of each respective target-image of the number of target-images.

30. The method of claim 29 wherein determining a number of target-images based at least upon the number of potential target-images comprises:

determining a respective target-image includes a respective characteristic for each of the number of potential target-images; and for each target having a respective characteristic, comparing the respective characteristic to at least one defined criteria, wherein the number of target-images is comprised of each respective potential target-image of the number of potential target-images having a respective characteristic matching at least one defined criteria.

31. The method of claim 29 wherein the least one machine-readable symbol object of the number of objects includes a first machine-readable symbol object and a second machine-readable symbol object, wherein the target-image having the highest rank is a respective image of the first machine-readable symbol object, wherein the target-image having the next highest rank is a respective image of the second machine-readable symbol object, and wherein projecting a respective light-indicia of the number of light-indicia toward the respective region-of interest in the respective sub-area of the area encompassed by the field-of view of the handheld machine-readable symbol reader for at least one target-image of the number of target images in accordance with the ranking of each respective target-image of the number of target-images comprises:

at a first time, projecting a first light-indicia of the number of light-indicia toward the region-of-interest associated with the machine-readable symbol object; and at a second time that is later than the first time, projecting a second light-indicia of the number of light-indicia toward the region-of-interest associated with the next machine-readable symbol object.

32. The method of claim 31 wherein producing a number of light-indicia in the form of light reflected from a reflector of the handheld machine-readable symbol reader comprises:

producing a first light-indicia in the form of light reflected from the reflector of the handheld machine-readable symbol reader, wherein the first light-indicia is projected toward the respective region-of-interest associated with the highest ranked target-image; and producing a second light-indicia in the form of light reflected from the reflector of the handheld machine-readable symbol reader, wherein the second light-indicia is projected toward the respective region-of-interest associated with the next highest ranked target-image.

33. The method of claim 32 wherein the first light-indicia and the second light-indicia are different.

34. The method of claim 29 wherein determining a number of target-images based at least upon the number of potential target-images comprises excluding the least one non-machine-readable symbol object from the number of target-images.

35. The method of claim 29, further comprising:
manually aiming the handheld machine-readable symbol reader toward the number of objects.

36. The method of claim 29, further comprising:
manually actuating the handheld machine-readable reader.

* * * * *